UNITED STATES PATENT OFFICE.

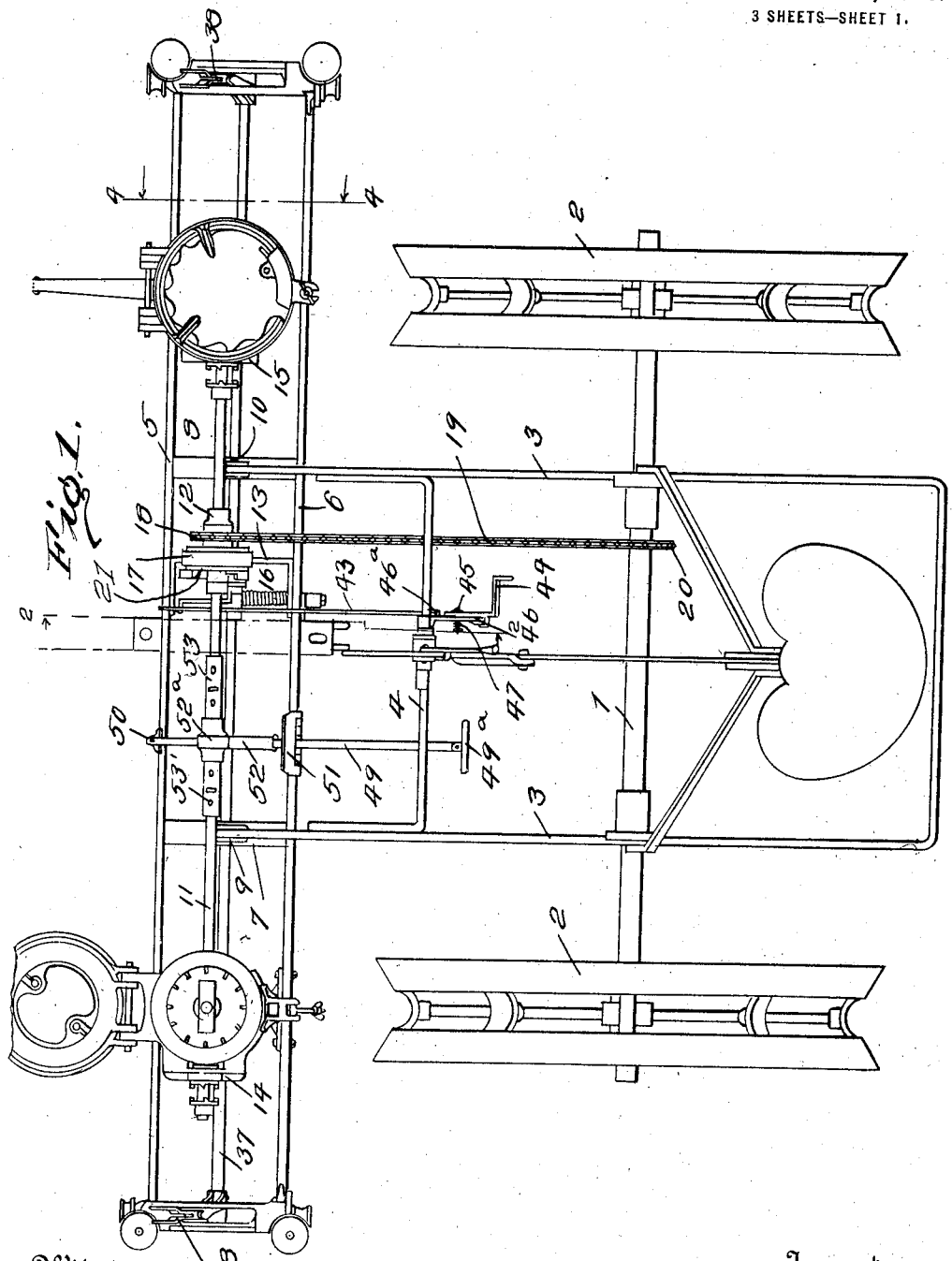

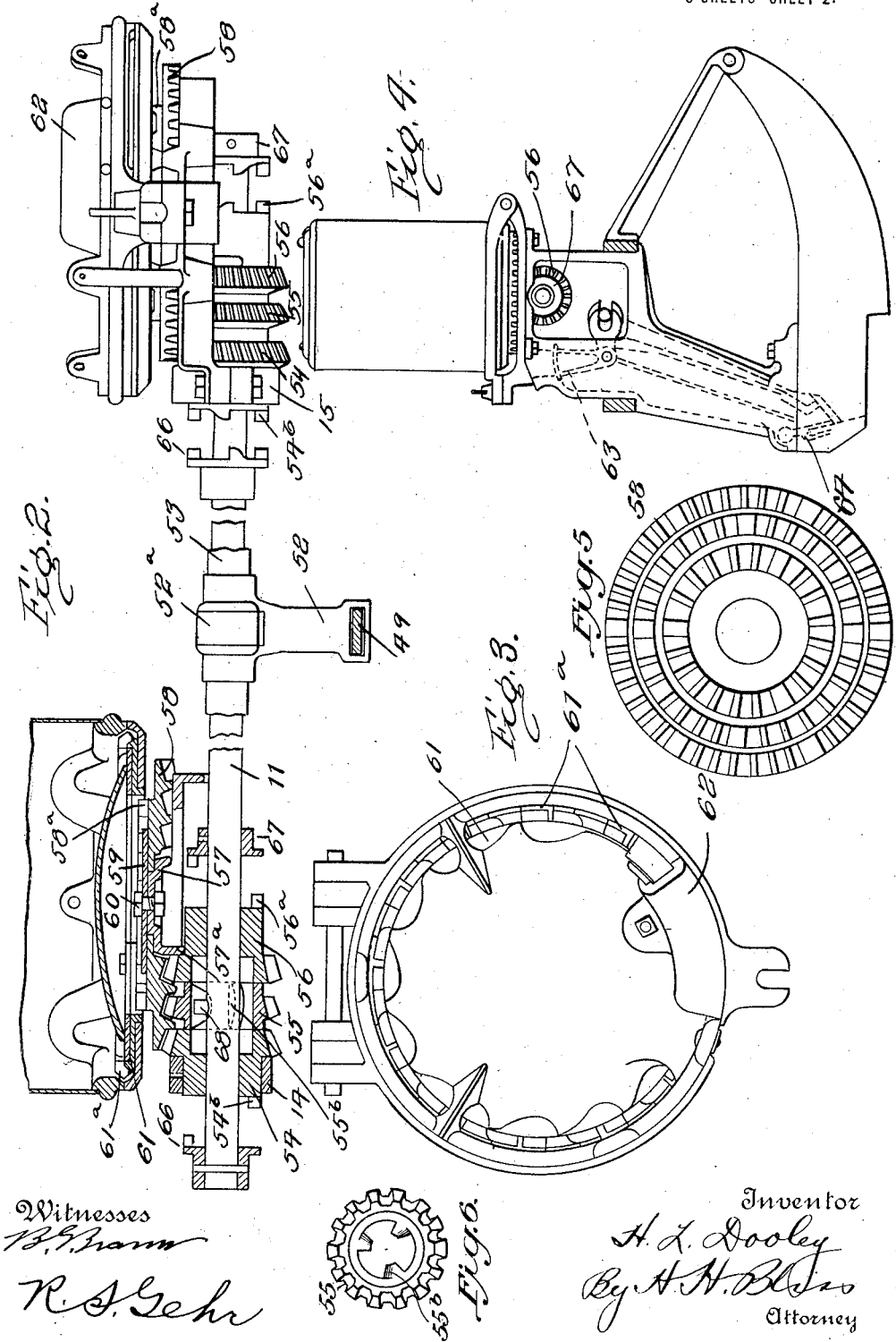

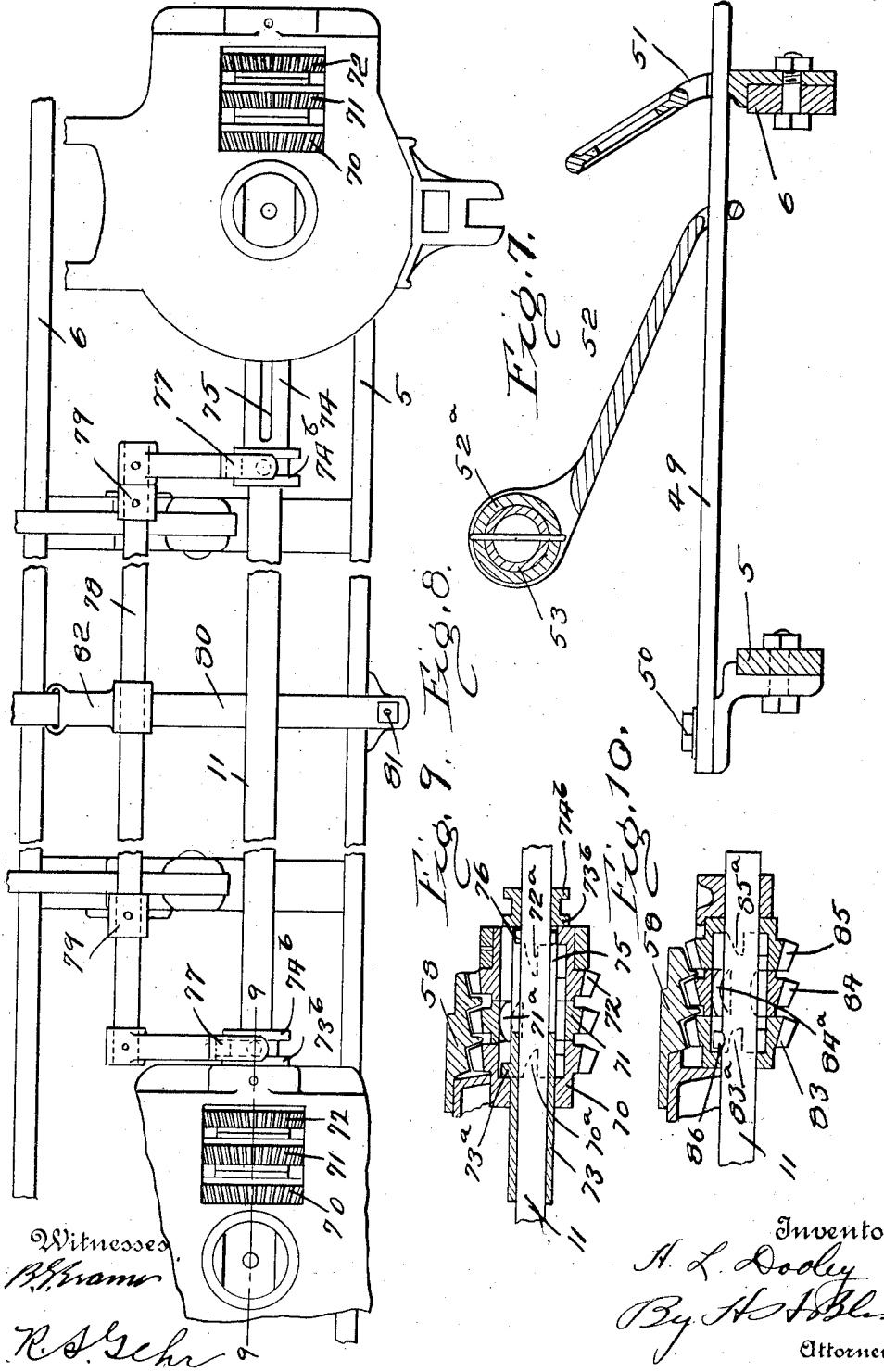

HARRY L. DOOLEY, OF ROCK ISLAND, ILLINOIS, ASSIGNOR TO DEERE & COMPANY, OF MOLINE, ILLINOIS, A CORPORATION OF ILLINOIS.

PLANTER.

1,328,730.　　　　　Specification of Letters Patent.　　Patented Jan. 20, 1920.

Application filed March 24, 1910, Serial No. 551,232. Renewed June 10, 1919. Serial No. 303,253.

*To all whom it may concern:*

Be it known that I, HARRY L. DOOLEY, a citizen of the United States, residing at Rock Island, in the county of Rock Island and State of Illinois, have invented certain new and useful Improvements in Planters, of which the following is a specification, reference being had therein to the accompanying drawing.

This invention relates to improvements in planters, pertaining more particularly to planters of the class in which use is made of a clutch controlled seeding mechanism, together with devices by which the action of the latter can be varied according to the election of the operator at the times of delivery of the seed.

Figure 1 is a plan view of a planter embodying my improvements.

Fig. 2 is a view, partly in cross section and partly in elevation, of the mechanism at the bottom of the seed hoppers.

Fig. 3 is a plan view of one of the hopper bottoms.

Fig. 4 is a vertical section on the line 4—4 of Fig. 1.

Fig. 5 is a bottom detail view of one of the multiple gears for driving the seed plates.

Fig. 6 is a detail end view of one of the pinions 55.

Fig. 7 is a sectional view of the device for shifting the gearing to vary the movement transmitted to the seed plates.

Fig. 8 is a fragmentary plan view showing a modification of the variable gearing for transmitting movement to the seed plate mechanism.

Fig. 9 is a vertical section on the line 9—9 of Fig. 8.

Fig. 10 is a sectional view showing a further modification of the gearing.

In the drawings I have shown a planter more or less completely, which is adapted to have my improvements applied thereto; but it will be understood that with respect to many of the details, there can be departure from those shown without departing from the invention.

In the mechanism shown, 1 is the main axle having the ground wheels 2, 2 thereon. The main wheel frame comprises the bars 3, 3, a rear transverse bar, and a front cross bar 4. The front frame has transverse bars 5 and 6 connected by cross bars 7 and 8, and also connected by the base frames of the seeders, and by the check head frames. The front and rear frames are pivotally connected at 9 and 10. 11 is the seeder shaft which drives the seeder plates. It is supported by bracket 12, carried by bar 13, and by bearings 14 and 15. 16 indicates the clutch mechanism as an entirety. This may be of any desired form but I prefer to use a clutch similar to that shown and described in my co-pending application entitled Planters, filed March 24, 1910, Ser. No. 551,233. It is sufficient to here describe the clutch as comprising a drum 17 loosely mounted on the shaft 11 and continuously driven by means of the sprocket wheel 18, the chain 19 and the sprocket wheel 20 from the main driving axle 1. A disk 21 is mounted upon the shaft to rotate with it, provision being made, however, for longitudinal movement of the shaft relative to the disk. A mechanism is provided whereby the disk 21 may be intermittently connected with the drum 17 to rotate the shaft 11 through a definite angle. This mechanism is thrown into operation by the engagement of a check wire tappet with one of the forks 38 which serves to rock the shaft 37. For purposes of illustration I have shown a clutch adapted to rotate the shaft 11 through one-half a revolution at each actuation.

I have provided means whereby the seed plates may be driven from the intermittently operated shafts and whereby the angle of rotation of each seed plate at each shaft actuation may be varied in accordance with the will of the operator. In the preferred form of my invention which I have chosen for purposes of illustration, this means comprises a plurality of series of bevel gear teeth located beneath each hopper.

It has been already noted that the shaft 11 is free to move longitudinally through the elements of the clutch 16, and it is to be further observed that the shaft is also free to slide endwise in its bearings. Such endwise movement is imparted by means of the foot lever 49 which is pivoted at 50 to the cross bar 5 and which extends backward through the notched bracket 51. The lever is connected to the shaft 11 by means of the arm 52, this arm having a sleeve 52ª which fits a sleeve 53 mounted on the shaft. The shaft is preferably in two sections which are connected by means of the sleeve 53. The sleeve is provided with two series of holes 53' for pins whereby the length of the shaft can be adjusted to permit the variation of the distance between the said mechanisms. The lever 49 is provided with a stirrup 49ª for the operator's foot.

The ends of the shafts 11 extend through the bearings 14 and 15 and fit in the hubs of pinions 54 in the said bearings. Next to the pinions 54 are the pinions 55 and beyond them are the pinions 56. All of the pinions are held against endwise movement by the bearings 14 and 15 and by flanges 57ª on the seeder mechanism frame.

58 is one of two similar multiple bevel gear wheels provided with teeth arranged in three circular concentric rows of different diameters, these rows of teeth meshing respectively with the pinions 54, 55 and 56. The gear is mounted on the casting 57 and is held in place by the plate 59 and the bolt 60. As shown in Fig. 5 for purposes of illustration the inner row is provided with 21 teeth, the middle row with 28 teeth and the outer row with 42 teeth. It is to be understood, however, that the actual numbers of teeth is not essential and that it is only necessary in carrying out my invention to provide the proper relation between the numbers of these teeth.

In the example chosen, each of the pinions is provided with 14 teeth and, as shown in Fig. 6, two diametrically opposed teeth are made larger than the others. Enlarged spaces are provided at intervals between the teeth of the rows on the plate 58 to mesh with or receive the enlarged teeth of the pinions. In the example chosen the inner row will have 3 of these larger spaces, the middle row 4, and the outer row 6.

Each of the gears 58 is provided with upstanding lugs 58ª, which engage with lugs on the seed plate 61 which is supported above the gearing so as to be rotated by it. A seed delivery plate may be used of any preferred form having individual seed cells; that is to say, cells each of which is adapted to receive a single seed only. The particular construction which I have shown for the purposes of illustration is that disclosed in my co-pending application entitled Seeders or dropping mechanism for planters, filed March 24, 1910, Ser. No. 551,231. It is here sufficient to say that the seed plate 61 is provided with a series of peripheral cells 61ª each adapted to receive a single seed, and when the plate is rotated to carry said seed beneath cut-off and knock-out devices mounted within the housing 62. For purposes of illustration, I have shown a seed plate having twelve cells, as such a seed plate is adapted to coöperate with gearing having the numbers of teeth which I have before set forth.

As the seeds pass under the knock-out devices they are discharged and delivered to a dropping mechanism. This latter mechanism may be of any preferred form. In the drawings I have indicated an upper valve 63 and a lower valve 64, both being actuated by suitable connections with the check head mechanism. These valves control the passage of the seeds downward through the seed boot and when suitably actuated cause the seeds to be deposited in hills in a well known manner.

Returning now to the gearing interposed between the seeder shaft and the seed plate, 66 are clutch elements on the shaft 11 and are adapted to engage corresponding clutch elements 54ᵇ on the pinions 54. 67 are clutch elements adapted to engage the clutch elements 56ª on the pinions 56. 68 is a feather or key on the shaft 11 and is adapted to engage internal teeth or lugs 55ᵇ on pinions 55. In order to properly coöperate with gearing having the numbers of teeth set forth and with a seed plate having the number of teeth set forth, each gear 55 is provided with three equally spaced internal teeth, and each of the clutch elements 66, 54ᵇ, 67 and 56ª are provided with four teeth.

As has been before stated, the shaft 11 may be longitudinally shifted. When shifted toward the right, as viewed in Fig. 2, the clutch elements 66 will be thrown into engagement with the clutch elements 54ᵇ, and the pinions 54 will be driven. Each of the pinions 54 will serve to drive the corresponding gear 58 and seed plate 61. Each key 68 will move idly in the space within one of the gears 56. It will be understood that the gears 55 and 56 will be incidentally also driven by the gear 58 but their motion will be independent of that of the shaft.

When the shaft 11 is moved to its central position each of the keys 68 will engage one of the teeth 55ᵇ on one of the gears 55. All of the clutch elements will be out of engagement, as shown in Fig. 2. The gears 58 and seed plate 61 will be driven by the pinions 55 but through a greater angle for each shaft actuation than previously. The pinions 54 and 56 will be rotated idly.

When the shaft is moved to its left hand position, as shown in Fig. 2, the clutch elements 67 will engage the clutch elements 56ª to rotate the gears 56. This will drive the gears 58 and the seed plate 61 through a still greater angle for each shaft actuation. As before the gears 54 and 55 will be rotated idly.

It will be apparent that while the pinions 54, 55 and 56 are of equal diameters they engage the plate 58 at different radial points and hence serve to drive it through different angles in accordance with which gear is operatively connected with the shaft.

I prefer to so construct the clutch 16 that the shaft 11 will be rotated through a half revolution for each actuation of a check row fork. Therefore, with the numbers of teeth and seed cells indicated in the example which I have chosen for illustration, seven teeth of the driving pinion, regardless of which one it may be, will be moved past the point of engagement with the gear plate 58 at each shaft actuation. If the pinion 54 is operative the gear plate will be driven through the angle occupied by seven teeth of the outer row, i. e., through one-sixth of a revolution. As the seed plate has twelve cells, one-sixth of these, or two will be moved under the cut off. When the pinion 55 is operative, the gear 58 will be moved through the angle occupied by seven teeth of the central row, i. e., through one-fourth of a revolution. Correspondingly, one-fourth of twelve cells, or three cells of the seed plate, will be moved past the cut-off. When the pinion 56 is operative, the gear 58 will be moved through the angle occupied by seven teeth of the inner row, i. e. one-third of a revolution. Correspondingly, one-third of twelve cells, or four cells of the seed plate will be moved past the cut-off.

The bracket 51 is preferably provided with indicating characters such as numerals 2, 3, 4, showing those positions for the foot lever 49 which correspond to the positions of driving engagement for the pinions 54, 55, and 56.

As has been before indicated, it is not absolutely essential that the exact numbers of teeth and seed cells which I have indicated be used. I have found, however, that while it is possible to design planters having other numbers of teeth and cells, that which I have shown is the arrangement which is simplest and most practical. It is furthermore to be observed that in the arrangement shown the positions of all of the pinions at the end of each shaft actuation are such that the shaft may be freely moved without any interference or abnormal engagement between any of the clutch parts or between the key 68 and the teeth 55$^b$, and it is also to be observed that after the shaft has been thus shifted the clutch elements or the key 68 and teeth 55$^b$ are in the proper relative positions to immediately start the movement of the proper pinion without any lost motion between it and the shaft. A study of the relations between the gears shows that if, for instance, the pinion 54 is engaged, the pinion 55 will be moved at each actuation through one-third of a revolution, i. e., sufficiently to move one tooth 55$^b$ out of operative alinement with the key 68 and the next succeeding tooth 55$^b$ into operative alinement. At the same time the pinion 56 will be driven through one-fourth of a revolution, or sufficiently to move the clutch elements 55$^a$ from one position of operative alinement with the clutch elements 67 and into the next succeeding position of operative alinement. Similar movements of the pinions occur when either of the other pinions are operative, and it is therefore true that at the end of each movement of the shaft and the pinions all of the driving elements of the pinions are in position to be immediately engaged by the corresponding elements of the shaft.

The enlarged teeth of the pinions and the enlarged spaces of the gears 58 insure the proper relative positioning of the pinions and gears when the planter is being assembled. Were it not for these enlarged teeth and spaces it would be possible for a careless workman to so assemble the gearing that the shaft 11 could not be shifted without interference between the pinion driving parts, and so that if the shaft were shifted a certain amount of lost motion would occur before the proper pinion would be engaged during the first shaft actuation. With the construction which I have shown it is possible for the operator to easily shift the mechanism at any time and without the danger of a defective hill being planted immediately following the change.

In Figs. 8, 9 and 10 I have shown a modified form of the gearing which forms the driving connections between the seeder shaft and the seed plates. In this construction the seed plate gear 58 is retained and it is driven by three pinions 70, 71 and 72. But instead of connecting the seeder shaft 11 with the different pinions by sliding said shaft endwise, I provide sleeves 73, 74, which are slidably mounted on the seeder shaft at its outer ends. Except for the difference in the length of these sleeves they are substantially the same in construction and I shall therefore describe but the one, namely, the sleeve 73, which is shown in section in Fig. 9. The sleeve is formed with slots 75 to receive pins or keys 76 on the shaft 11 which serve to turn the sleeve with the shaft. The sleeve carries one or more lugs or teeth 73$^a$ which are adapted to engage the internal teeth 70$^a$, 71$^a$ and 72$^a$ of the pinions 70, 71, 72, respectively. By sliding the sleeves 73 endwise the tooth 73$^a$ can be brought into engagement with the internal teeth of any one of the three pinions.

It is desirable that the sleeves may be moved readily and conveniently by the operator and to this end the sleeves are formed at their inner ends with grooved collars 73$^b$, 74$^b$, which are engaged by the forked ends of arms 77. These arms are mounted on the ends of the transverse bar 78 which is slidably supported in bearing brackets 79 on the front frame of the machine. 80 is a foot lever having its front end pivoted at 81 on the bar of the front frame. This lever is connected by the arm 82 with the sliding bar 78 and by swinging the lever, said bar, and with it the sleeves 73, 74, can be moved endwise. Such endwise movement of the sleeves, as has been stated, will result in the connection of one or another of the pinions with the seeder shaft 11 so that for a given movement of the seeder shaft, a movement of varying extent can be given to the seed plate gear 58.

In Fig. 10 I show still another modification of the gear illustrated in Fig. 2. Here the three pinions 83, 84, 85, which mesh with the seed plate gear 58, are each provided with internal teeth 83ᵃ, 84ᵃ and 85ᵃ, respectively, and the slidable seeder shaft 11 carries one or more teeth or lugs 86 adapted to engage the internal teeth of any one of the three pinions, it being understood that the construction otherwise is similar to that shown in Fig. 2.

I am aware of the following facts: First, that the seed delivering mechanism in corn planters have been heretofore constructed with the multiple geared plate or cell, combined with a pinion which could slide from one to the other to impart different speeds and extents of movement; second that heretofore use has been made or proposed of a series of mutilated gears for each seeding mechanism, each series as an entirety being movable in relation to one circle of teeth on the seed plate, that gear of the series having fewest teeth being intended to impart some angular movement to the plate, and the others greater angular movements according to their greater numbers of teeth; third, that use has been made of devices such as clutch dogs which could be thrown out of action during one or more parts of the revolution of the driving shaft in order to impart intermitting steps or movement to a seeder plate.

But the mechanism which I have devised possesses a number of marked advantages over each of the earlier styles of driving means for seeder plates, with which I am acquainted. The different pairs of companion gears, in my case, remain in constant mesh and there is no danger of their losing their proper timed relations with the cells in the plate, whereas, when a single driving cell is used, it shifts from one to another of the driven tooth sets, there is such danger. Similarly where mutilated gears are employed which are shiftable from one position to another, there is the same danger of losing the proper timed relationship between the gears and the plate. With constructions of the third style referred to, namely, those having intermittingly engaging, or intermittingly skipping or jumping parts such as clutch dogs, numerous small parts and springs are necessary, there are uncertainties in effecting the quick engagements expected of them, and errors and inaccuracies occur.

In the present case the driving and the driven parts are in constant connection, and after the movement once starts, it continues smoothly and without interruption till the termination of the predetermined cycle.

I do not herein specifically claim the modified forms of the mechanism as shown in Figs. 8, 9 and 10, as a mechanism in some respects similar is shown in my co-pending application Ser. No. 560,642 and therein specifically claimed.

What I claim is—

1. In a planter, the combination of a seeder shaft, driving connections adapted to intermittently connect the seeder shaft to the axle to give the shaft repeated definite movements, a seed separating plate, a driving gear beneath the plate and connected to it, the gear having a plurality of concentric series of teeth, a plurality of pinions on the seeder shaft each permanently meshing with one of the said series of teeth, and a slidable key connected with the seeder shaft and adapted to engage any one of the pinions, the said pinions being provided with longitudinal keyways for receiving the key, the numbers and relative positions of the keyways being such that after each actuation of the shaft and of the pinions a keyway of each pinion is in alinement with the said key.

2. In a corn planter the combination of a rotary seeder plate with uniformly spaced single kernel cells and having directly beneath it a series of differing sets of gear teeth operatively connected with the plate, a receptacle to which the kernels pass from the plate situated to register with the last cell of a variable series of cells predetermined to reach the receptacle at each movement of the plate, a series of gear wheels corresponding and permanently engaging respectively with the teeth of the said sets, a shaft passing through the said gears, a continuously moving prime driver, a tappet-actuated clutch for imparting power from the prime driver to the shaft through successive predetermined cycles, and a power transmitting axially sliding tooth adapted to engage the pinions alternately, the points of engagement of the sliding tooth having a multiple relation with the cells in the seed plate.

3. In a corn planter the combination of a seeder plate having uniformly spaced seed cells each taking a predetermined number of kernels, a series of sets of gear teeth arranged directly beneath and connected to the plate, a kernel receptacle below the plate situated to register with the last cell of each of several series of cells predetermined to be brought to it at each movement of the plate, a series of pinions permanently connected respectively with the teeth of the aforesaid several sets of gear teeth, said pinions having clutch parts whose members are multiples of the cells in the plate, a shaft for actuating all of the said driving pinions, a continuously moving prime driver, a tappet-actuated clutch for imparting power to the said shaft intermittingly through successive equal predetermined cycles, and supplemental power transmitting clutch parts adapted to connect the driven element of the tappet-actuated clutch alternately with the said pinions, substantially as set forth.

4. The combination in a planter, of two seed separating and depositing mechanisms, a transverse frame between the two mechanisms, means for adjustably connecting the two mechanisms to the frame whereby the distance between them may be varied, a two-part operating shaft, one part for each of the said seed separating mechanisms, means for connecting the inner ends of the shaft parts, the said connecting means being adapted to permit the adjustment of the shaft parts relative to each other in accordance with the distance between the seed separating and depositing mechanisms, means slidably engaging the shaft for intermittently driving it through definite predetermined angles, change-speed gearing between each shaft part and the corresponding seed separating and depositing mechanism, comprising a series of pinions loosely mounted on each shaft part and fixed against bodily movement with respect to the frame, means for moving the said shaft as a whole longitudinally, and means dependent on the longitudinal movement of the shaft for connecting thereto one or another of the pinions at each end.

5. In a corn planter the combination of a frame, a seeder mechanism thereon having a rotary plate with uniformly spaced single kernel cells, two differently speeded pairs of gear mates directly beneath the plate, one gear of each pair being driven and when it is power actuated causing the plate to travel at each of its movements over either of several distances which are differing multiples of the distance from one cell to the next and the mates of each pair being constantly in mesh, a kernel receptacle below the plate registering with the last cell of the series of cells predetermined to reach it at each movement of the plate, a continuously acting prime mover actuated by the ground wheels, a tappet-actuated clutch having a normally idle driven member for transmitting parts of said power through successive predetermined cycles to the said driving gear, and a supplemental clutch device for connecting the driven element of the tappet-actuated clutch to the said pairs of gear mates alternately, the active elements of the said supplemental clutch being angularly related to correspond with the predetermined distances of travel, of the seed plate, substantially as set forth.

6. In a corn planter, the combination of a frame, a seeding mechanism thereon having a plate with uniformly spaced single kernel cells and adapted to travel at each of its movements over either of several different distances each of which are multiples of the distances from one cell to the next, a kernel receptacle below the plate registering with the last cell of the series of cells predetermined to reach it at the end of the movement of the plate, two differently speeded pairs of gear mates all the gears of the pairs being normally in mesh connection with the plate and one gear of each pair being a driver and the other of said pair being driven and adapted to move the seed plate through one of its said predetermined multiple distances, a continuously acting prime driver actuated from the ground wheels, a tappet-actuated clutch having a normally idle member for transmitting parts of said power through successive predetermined cycles to the said driving gear, a supplemental clutch device for connecting at will the driven element of the tappet-actuated clutch to the said driving gears alternately while the machine is in operation, the active elements of the said supplemental clutch being angularly related to correspond with the predetermined varying distances of travel of the seed plate, and a normally locked lever pivoted to the frame independently of the rotary parts for actuating the supplemental clutch.

7. In a planter, the combination of two seed separating and depositing mechanisms, a frame upon which the mechanisms are mounted, a transverse operating shaft for the two mechanisms, means for moving the shaft longitudinally, means slidably engaging the shaft for intermittently driving it through definite predetermined angles, change-speed gearing between each end of the shaft and the corresponding seed separating and depositing mechanism comprising a series of pinions loosely mounted on the shaft and fixed against bodily movement with respect to the frame, and means dependent on longitudinal movement of the shaft for connecting thereto one or another of the pinions at each end.

8. In a planter, the combination of two seed separating and depositing mechanisms each comprising a seed plate rotatable about a vertical axis, two driving gears each mounted beneath and connected to a plate and having a plurality of concentric series of teeth, a transverse operating shaft mounted on the frame, means for moving the shaft longitudinally, means slidably engaging the shaft for intermittently driving it through definite predetermined angles, pinions mounted loosely upon the shaft, a plurality being mounted at each end in permanent mesh respectively with the concentric series of teeth of the corresponding driving gear, and means dependent on the longitudinal movement of the shaft for connecting thereto one or another of the pinions at each end.

9. In a corn planter, the combination of a frame, a seeder mechanism having a rotary single-kernel-cell plate adapted to travel at each of its movements over either of several distances which are multiples of a predetermined unit distance, three differently speeded drilling drivers for said plate each adapted to continuously rotate the plate, means for interrupting the action of all of the said drilling drivers, means for connecting either of said drivers to the plate either before or after such interruption without altering the driving relations thereof to the plate, and means brought into operation at will for throwing out of action the interrupting means, substantially as set forth.

10. In a corn planter, the combination of a runner frame, a seeder mechanism having a rotary seed plate with uniformly spaced single kernel cells and adapted to travel at each of its movements over either of several distances which are different multiples of the distance from one cell to the next, a kernel receptacle below the plate registering with the last cell of the series of cells predetermined to reach it at each movement of the plate, a valve mechanism adapted to be opened to permit the movement of seeds from the receptacle to the ground, a tappet actuated clutch receiving power from the ground wheels of the planter and having a member adapted to be intermittently driven through successive predetermined multiple distances, means for momentarily opening the said valve mechanism at each movement of the driven member of the clutch, change-speed gearing between the said driven clutch member and the said seeder mechanism comprising two pairs of differently speeded gear mates held permanently in mesh, each pair adapted when actuated to drive the seeder mechanism through one of the aforesaid distances, means within the control of the operator for connecting the driver gear of either of the said pairs with the driven element of the clutch, and means within the control of the operator for causing the clutch to remain continuously engaged and for holding the said valve mechanism continuously open thereby continuously driving the said seeder mechanism and continuously depositing seeds at one speed or another according to whether one or the other of the said driver gears is connected with the driven clutch element.

In testimony whereof I affix my signature in presence of two witnesses.

HARRY L. DOOLEY.

Witnesses:
GALE PORTER,
RALPH B. LOURIE.